United States Patent
Longfield et al.

(10) Patent No.: US 7,842,900 B2
(45) Date of Patent: Nov. 30, 2010

(54) PROCESS FOR JOINING USING A LASER BEAM

(75) Inventors: Nicholas Peter Longfield, Pontyclun (GB); Engbert Jan De Wit, Luxemburglaan (NL)

(73) Assignee: Aleris Aluminum Koblenz GmbH, Koblenz (DE)

( * ) Notice: Subject to any disclaimer, the term of this patent is extended or adjusted under 35 U.S.C. 154(b) by 686 days.

(21) Appl. No.: 11/780,210

(22) Filed: Jul. 19, 2007

(65) Prior Publication Data
US 2008/0257870 A1    Oct. 23, 2008

Related U.S. Application Data

(60) Provisional application No. 60/832,968, filed on Jul. 25, 2006.

(30) Foreign Application Priority Data
Jul. 21, 2006    (EP)    .................... 06015276

(51) Int. Cl.
  *B23K 26/20*    (2006.01)
  *B23K 26/14*    (2006.01)
(52) U.S. Cl. .............. 219/121.64; 219/121.84; 219/121.85
(58) Field of Classification Search ............ 219/121.63, 219/121.64, 121.6, 121.84, 121.85
See application file for complete search history.

(56) References Cited

U.S. PATENT DOCUMENTS

| | | | |
|---|---|---|---|
| 3,053,968 A | | 9/1962 | Gorman et al. |
| 4,560,856 A | * | 12/1985 | Miller et al. ............ 219/121.63 |
| 6,153,854 A | * | 11/2000 | Haszler et al. ......... 219/121.64 |
| 7,015,417 B2 | | 3/2006 | Takikawa et al. |
| 2002/0117485 A1 | * | 8/2002 | Jones et al. ............ 219/121.64 |
| 2004/0000539 A1 | | 1/2004 | Takikawa et al. |
| 2005/0121426 A1 | | 6/2005 | Wang et al. |

FOREIGN PATENT DOCUMENTS

| | | | |
|---|---|---|---|
| DE | 19846368 C1 | * | 4/2000 |
| DE | 101 13 471 A1 | | 10/2002 |
| DE | 103 32 003 B3 | | 12/2004 |
| EP | 0956195 | | 7/1998 |
| FR | 2 825 305 A1 | | 12/2002 |

(Continued)

OTHER PUBLICATIONS

Machine translation of Japan Patent document No. 2000-233,289, Mar. 2010.*

(Continued)

*Primary Examiner*—Geoffrey S Evans
(74) *Attorney, Agent, or Firm*—Novak Druce + Quigg LLP

(57) ABSTRACT

A process for joining a first metal component to a second metal component at a joining region including the steps of: projecting a laser beam onto one or the components for providing a melt pool on the joining region; providing a metal filler wire into the melt pool while substantially simultaneously providing a substantially laminar flow of a substantially inert process shielding gas to the location of the melt pool wherein the process shielding gas flows substantially coaxially around the filler wire; and solidifying the melt pool thereby forming a joint at the joining.

13 Claims, 3 Drawing Sheets

FOREIGN PATENT DOCUMENTS

| | | | | |
|---|---|---|---|---|
| GB | 2 384 455 | A | | 7/2003 |
| JP | 6-218 572 | A | * | 8/1994 |
| JP | 06-297 173 | A | * | 10/1994 |
| JP | 2000-233 289 | A | * | 8/2000 |
| JP | 2001-113 384 | A | * | 4/2001 |
| JP | 2001-198689 | A | * | 7/2001 |
| JP | 2002-79 371 | A | * | 4/2002 |
| JP | 2002-103 078 | A | * | 4/2002 |
| JP | 2006-167 725 | A | * | 6/2006 |
| WO | 97/39852 | A1 | | 10/1997 |
| WO | 9828130 | | | 7/1998 |

OTHER PUBLICATIONS

Machine translation of Japan Patent document No. 2001-198,689, Mar. 2010.*

Machine translation of Japan Patent document No. 2002-103,078, Mar. 2010.*

Machine translation of Japan Patent document No. 2006-167,725, Mar. 2010.*

* cited by examiner

PROCESS FOR JOINING USING A LASER BEAM

CROSS REFERENCE TO RELATED APPLICATION

This claims the benefit of U.S. provisional patent application No. 60/832,968, filed Jul. 25, 2006 and EP 06015276.6 filed Jul. 21, 2006, both incorporated herein by reference in their entirety.

FIELD OF THE INVENTION

The present invention relates to a process for joining a first metal component to a second metal component. Further an apparatus for use in this process is described.

BACKGROUND OF THE INVENTION

By focussing a laser beam on a metal, a melt pool can be created. At a sufficiently high power density a keyhole or channel is created in the material running through the entire thickness of the components to be welded. By moving the laser beam with respect to the component, new material melts at the front of the keyhole and material solidifies at the rear thus creating the weld.

Shielding gas prevents the metal from oxidation. Laser welding can be performed without the addition of filler wire to the melt pool (autogeneous welding), or with addition of filler wire to the melt pool (heterogeneous welding). The latter may be done, e.g., to fill the gap or optimise the weld metal composition.

With laser welding, continuous joints can be produced at high speed. Other advantages are the low heat input compared to other welding processes, resulting in a narrow weld and small heat affected zone.

SUMMARY OF THE INVENTION

As will be appreciated herein below, except as otherwise indicated, alloy designations of the wrought and casting alloys refer to the Aluminum Association designations in Aluminum Standards and Data and the Registration Records, as published by the Aluminum Association in 2006.

The quality of a joint made by a laser welding process depends on a number of critical process parameters: laser type, laser power, welding speed, shielding gas and flow rate, geometry of the setup, wire feed speed, temperature, and last but not least on the type or types of metal components to be joined in terms of composition and shape of the components.

It is an object of the invention to provide a process for joining a first metal component to a second metal component with improved process stability.

It is also an object of the invention to provide a process for joining a first metal component to a second metal component for providing a weld with no or at least significantly reduced porosity in the weld.

One or both objects of the invention are reached by a process for joining a first metal component to a second metal component at a joining region comprising the steps of:
a. projecting a laser beam onto one of the components for providing a melt pool on the joining region;
b. providing a metal filler wire into the melt pool while substantially simultaneously providing a substantially laminar flow of a substantially inert process shielding gas to the location of the melt pool, wherein the process shielding gas flows substantially coaxially around the filler wire;
c. solidifying the melt pool thereby forming a joint at the joining region.

The term laminar is in particular understood as a fluid flow in substantially parallel layers, without any substantial disruptions between the layers. The laminar flow may be characterized by a high or substantial momentum diffusion and a low momentum convection, wherein pressure and velocity are independent from the parameter time. In the present invention, the laminar flow is preferably characterized by a Reynolds number of less than 2500, preferably less than 2100 and preferably more than 1.

According to one aspect, the first and/or the second component is made of a metal belonging to the group consisting of aluminum, aluminum alloy, aluminum or aluminum alloy substrate provided with a metallic coating system, or aluminum or aluminum alloy substrate provided with a cladding system. Further, the process shielding gas may be provided to the location of the melt pool by means of a gas diffuser.

According to a further aspect, the water content of the process shielding gas is at least 50 ppm, preferably at least 100 ppm.

According to a yet further aspect, the laser beam is configured as a double beam. Preferably, the process further comprises the steps of: distributing the welding power by separating a first power peak from a second power peak preferably by a power trough, converging the first power peak on the first component, and converging the second power peak on the second component.

BRIEF DESCRIPTION OF THE DRAWINGS

FIG. 1b shows an enlarged view of a portion of the embodiment of FIG. 1a.

DETAILED DESCRIPTION OF THE PREFERRED EMBODIMENTS

Figure 1A:
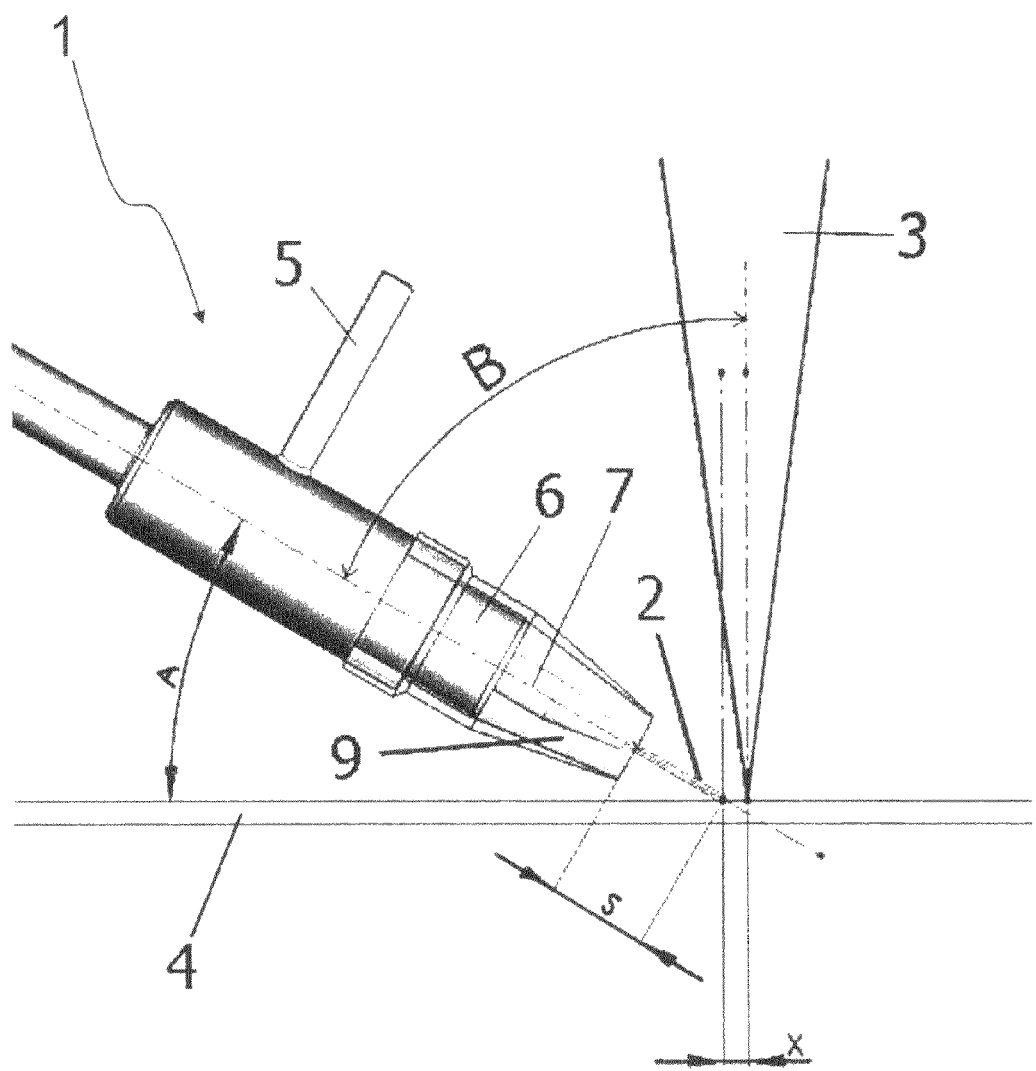
FIG. 1a shows an embodiment of an apparatus for performing an embodiment of the present invention.

With the process according to the invention the flow of the process shielding gas ensures that the weld is adequately shielded against the oxidising surrounding atmosphere. The provision of the metal filler wire, which is preferably a cold filler wire, allows achieving the proper mechanical properties of the weld or size of the heat affected zone. With a cold filler wire it is meant that the wire is not heated prior to introduction into the melt pool. The cooling effect of the filler wire when it is provided into the melt pool ensures that the welding is performed with as low a thermal load to the surrounding metal of the components as possible. Also, the filler wire avoids the so-called "drop-through" which may occur as a result of the low surface tension of the melt pool. The process shielding gas is provided substantially coaxially around the filler wire in a substantially laminar flow to achieve a gentle shielding of the melt pool, so as to cause no turbulence in the weld pool and avoid the formation of pores in the melt pool. The lamellar gas flow also assists in enhancing the stability of the laser generated keyhole. The filler wire thus enters the melt pool under very stable conditions.

The process shielding gas is substantially inert. By the term "inert" in this context it is meant that the process shielding gas does not interact with the metal filler wire and/or the melt pool so as to minimise and preferably avoid any reaction such as oxidation of the metal in the weld pool and/or the generation of pores in the melt pool and/or interact with the stability of the keyhole. Examples of inert process shielding gases are helium, argon, nitrogen or mixtures thereof. The inventors surprisingly found the process according to the invention not only provides very stable joining conditions and excellent joint properties, but also alloys which are known to be very sensitive to the joining parameters in the conventional laser joining process, could be joined with the process according to the invention while retaining substantially identical settings of the joining parameters for a wide range of chemical compositions. It should be noted, that for instances where it is less important or even unimportant to limit the heat input into the weld to a minimum, that a hot filler wire and/or an arc assisted laser welding process such as hybrid laser-MIG-welding could also be used.

Preferably, a Nd-YAG laser is used. Although the process according to the invention can be performed with any other type of laser beam (e.g. $CO_2$-laser), the use of a Nd-YAG laser provided excellent precision with a low heat input.

In an embodiment of the invention the laser beam moves substantially along the joining region to provide a plurality of joints and/or a continuous joint along the joining region. In this embodiment the joining of the first and the second components can be performed in an automated way thereby achieving a consistent weld quality along the joining region. It should be noted that the same effect is reached if the components are moved along a stationary laser beam.

Typically, the laser beam is projected onto one of the abutting components immediately next to the location where the components abut or the gap if the components do not abut perfectly.

In an embodiment of the invention shown in FIG. 1a, the angle B between the laser beam 3 and the substantially coaxial process shielding gas flow is between 5 and 85°, preferably between 20 and 80°, more preferably between 45 and 70°.

In case the laser beam 3 and the metal components (e.g. component 4) are perpendicularly oriented, the angle A, between the direction of the substantially coaxial process shielding gas flow and the top surface of the joining region or weld pool direction, the angle A is then between 5 and 85°, preferably between 10 and 70° and more preferably between 20 and 45°.

It was found that good stability of the keyhole and weld quality was achieved when the angle B between the laser beam and the substantially coaxial process shielding gas flow is between 5 and 85°. Preferably the angle B is chosen between 20 and 80°. A suitable maximum angle was found to be 70°. A suitable minimum was found to be 45°. The angle B providing an optimal stability of the keyhole and weld quality proved to be between 45 and 70° or even between 55 and 65°.

In an embodiment of the invention, the water content of the process shielding gas is between 0 and 500 ppm. Contrary to common belief, which holds that moisture in the process shielding gas should be avoided to avoid the inclusion of hydrogen in the weld, it was found that an improved weld quality and/or keyhole stability was obtained when the water or moisture content in the process shielding gas was chosen in this range. The window for the welding parameters to achieve stable welding conditions correspondingly widens. For instance, the pore count decreases significantly when the moisture content increases, even at increased laser power, welding speed and wire feed speed. The presence of some water or moisture in the process shielding gas proved to be beneficial. A suitable minimum appears to be 5 ppm. Preferably, the water or moisture content of the process shielding gas is at least 50 ppm, more preferably at least 100 ppm.

In an embodiment of the invention the first and/or the second component is selected from the group comprising:
aluminum;
an aluminum alloy;
aluminum or aluminum alloy substrate provided with a metallic coating system;
aluminum or aluminum alloy substrate provided with a cladding system.

The process according to the invention proved to be particularly suitable for the joining of components based on aluminum as its main constituent. The increased stability of the welding process and the excellent weld quality, particularly with regard to oxidation and porosity in the weld, and the widened process window makes the process extremely suitable for the joining of aluminum components. The cladding system provided onto an aluminum substrate or aluminum alloy substrate may comprise a single layer of metal, but it may also comprise two or more layers, such as 3, 4 or 5 layers. These cladding systems may be used to provide a low melting layer for brazing the aluminum or aluminum alloy substrate to another aluminum or aluminum alloy component, such as a fin, or a pipe in a radiator or a heat exchanger or other suitably shaped product involving brazing. The cladding system may also be used to provide corrosion resistance or other desirable property to the substrate or core alloy.

For example, in the process according to the present invention the first and/or the second component may be made of an AA2000, AA6000 or AA7000 series alloy.

Although the process according to the invention provides improved keyhole stability, weld quality, and wider process windows for all aluminum alloys, it appears the relative improvement is particularly significant for those aluminum alloys known to be difficult to weld. Aluminum alloys, such as heat treatable alloys, are widely used e.g. in aerospace such as aircraft skin sheet, transportation, shipbuilding, tankage, ballistic armour, and piping applications. The high coefficient of thermal expansion and solidification shrinkage, combined with the relatively wide solidification-temperature range makes these alloys susceptible to weld cracking. Alloys of the AA2000 series, in which high strength is achieved by copper and sometimes magnesium, and alloys of the AA7000 series, in which high strength is obtained by additions of zinc, magnesium and often copper, often demonstrate a susceptibility to weld cracking. Uses for the AA7000 alloys include aircraft constructions, truck trailers, railcars, and armour plate.

The process according to the invention also provides good weldability of AA8000-alloys as a result of the reduced porosity of the weld produced by the process according to the invention. It is believed that the suitability of the process according to the invention for welding these alloys results from the very stable welding process. There is consequently no need to use a larger heat input than necessary, and the use of cold filler wire further reduced the heat input. For welding crack sensitive aluminum alloys, the use of a cold filler wire is therefore preferable. The process according to the invention also allows many aluminum alloys to be welded using the same welding parameters, whereas before each alloy had to be welded using its own set of welding parameters. AA2000, AA5000 and AA7000 were found to be weldable with substantially identical welding parameter settings. It should be noted that the process, due to the improved weld stability and robustness of the process in terms of the setting of the welding parameters, and the improved quality of the weld, is also advantageously applicable to the welding of components produced from casting alloys, such as AA200, AA500 and AA700 series casting alloys.

In an embodiment, a laser is used which provides a multimodal welding power distribution, wherein the multimodal welding power distribution has at least a first power peak and a second power peak separated from the first power peak by a power trough, wherein the first power peak converges on the first component and wherein the second power peak converges on the second component. The laser energy may be provided by one or more single beam laser sources, or a multiple beam laser source. The multimodal welding power distribution may be provided by splitting the single or multiple laser beam using suitable optics. A single laser beam may for instance be split into two or more laser beams using splitter and mirrors. With the method according to the invention a wider weld is provided due to the presence of a plurality of power peaks. The convergence or focussing of at least a first power peak on the first component and at least a second power peak on the second component provides a power input over a wider distance than a single spot weld. When using a single spot weld, i.e. a welding power distribution comprising only one focussed laser beam, the power is concentrated on the location where two components abut. When using the multimodal weld power distribution, the power is introduced in the abutting components immediately next to the location where the components abut or the gap if the components do not abut perfectly, thereby achieving a more consistent power transfer.

The weld pools of the two foci join up and form a single melt pool, i.e. keyhole. The two foci thus effectively increase the spot size of the laser beam in comparison to a single beam. In this embodiment weld quality is not affected by the presence of a gap. It should be noted that the location of the power trough can be chosen by a suitable adjustment of the optical arrangement for focussing and/or splitting a laser beam or by providing one or more additional beams. This way, the depth of the trough can be adjusted between very deep (i.e. substantially no welding power in the trough) and almost absent (i.e. the welding power in the trough is at most the welding power of the first or second peak). In an embodiment of the invention the multimodal welding power distribution is a bimodal welding power distribution, for example twin spot welding. It should be noted that the advantages of a multimodal or a bimodal welding power distribution are more apparent when welding together abutting components. The advantage of using a twin- or multispot laser in comparison to a single spot laser is less pronounced, or perhaps even absent, when welding overlapping joints. Since the spatial separation between the focus of the first peak and the focus of the second peak is believed to be between 0.3 and 1.0 mm, the use of a multi- or twin spot welding process does not affect the way in which the process shielding gas and the filler wire is provided to the melt pool.

In an embodiment of the invention, the first component is joined to the second component by brazing. By adapting the settings of the process, for instance by defocusing the laser beam, the heat input of the laser can be reduced so as not to melt the substrate of the first metal component, but only the low melting part of the cladding system provided thereupon, for brazing it to the second metal component.

In a particular embodiment, the process according to the invention is used for welding structural components, which for example are part of a ship or an aircraft, in which a sheet product comprising a core sheet made of an aluminum alloy clad on at least one side with a clad layer is the first metal component and an aluminum alloy component is the second metal component. Typically the clad layer is an AA4000 series alloy. The first and the second metal components are joined by forming a melt pool, wherein the melt pool is formed from the metal of the clad layer and the metal of the second component, without melting the core sheet. Thus, only the clad layer of the first component, the sheet product, is melted. Consequently there is no melting of the core sheet. Particular reference is made to EP 0 956 195-B1, FIGS. 1 and 2 and the accompanying description, incorporated herein by reference in its entirety. Since the heat is kept away from the core sheet there occurs no or only very limited loss of mechanical properties in the core material, if this core material would be of a heat-treatable or a strain hardened non heat-treatable type. Additionally, the clad layer may provide corrosion protection, should the corrosion resistance of the core material not be sufficient. Preferably the Al-alloy of the core sheet is heat-treatable and more preferably of the AA2000, AA6000- or AA7000-type, or non-heat-treatable, more preferably of the AA5xxx-type Al-alloys. The clad layer may be of an alloy which is also used as filler material for the welding process. The clad layer may also be of the kind suitable for brazing, such as an AA4000 series.

Further, an apparatus is provided for providing a substantially laminar and substantially coaxial flow of a process shielding gas around a metal filler wire for use in a process according to the present invention, wherein the apparatus is provided with:
 means for creating a laminar process shielding gas flow in a first direction;
 means for directing the filler wire in the first direction, wherein the means for directing the filler wire are arranged to enable a coaxial laminar process shielding gas flow around the filler wire to be directed in the first direction.

With this apparatus, the substantially coaxial and laminar flow of a substantially inert process shielding gas can be provided around the filler wire to be directed in the direction of the melt pool. The first direction, in use, is pointed substantially towards the melt pool which is formed where the laser beam contacts the first and/or second metal component. Ideally, the first direction and the laser beam intersect at or near the center of the melt pool.

The invention will now be further described by means of the following, non-limiting schematic drawing and examples.

Figure 1B:
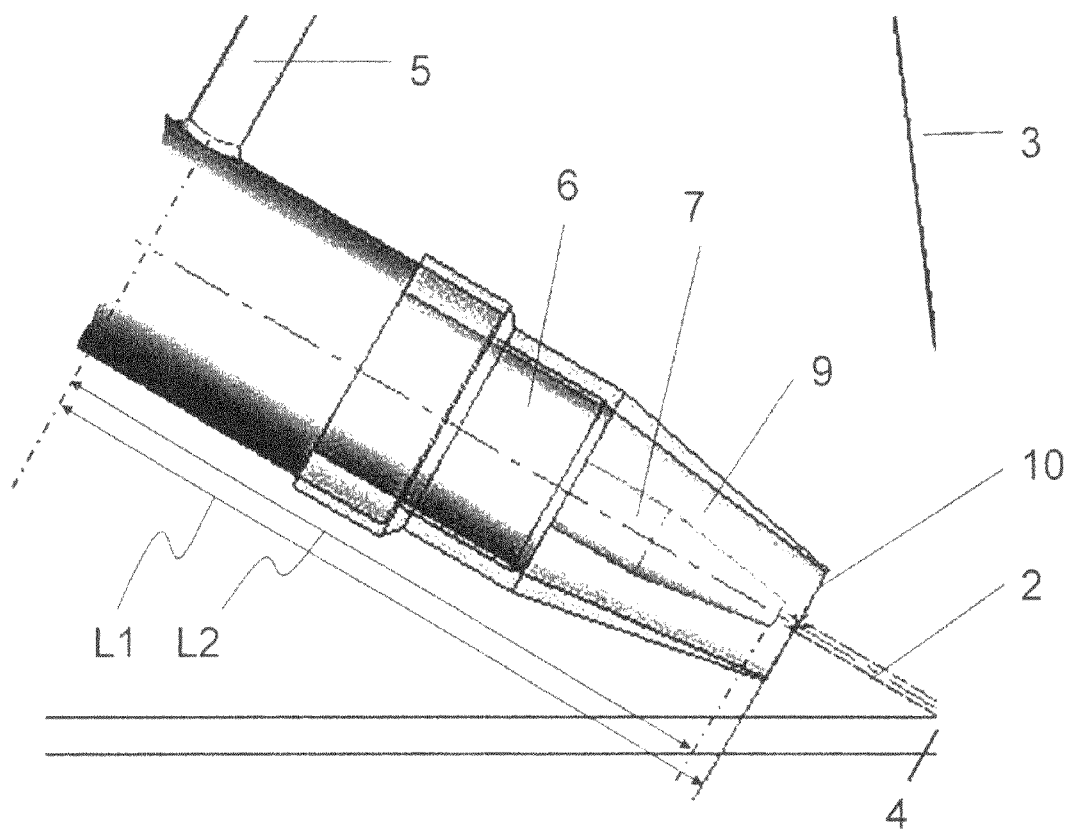

FIG. 1a shows schematically how the gas and wire feeder apparatus 1 for delivering the substantially laminar and coaxial process shielding gas flow (not shown) and the filler wire 2 is oriented with respect to the laser beam 3. It should be noted that the convergence of the laser beam 3 is strongly exaggerated in this figure. The angle A between the first direction of the filler wire 2 (represented by the dot-dash line in apparatus 1) and a metal component 4 is measured with respect to the metal component. For the sake of clarity only one metal component 4 is shown. The angle B is the angle between the first direction of the filler wire 2 and the direction of the laser beam 3. The apparatus 1 is provide with an inlet 5 for letting in the process shielding gas, means 6 for providing a laminar flow, such as gas diffuser, for instance a wire mesh, a tip 7, for instance a copper tip, for directing a filler wire 2 into the weld pool (not shown). In FIG. 1a, the process shielding gas flows around the tip 7 thorough a substantially annular channel 9 designed to maintain laminar flow. The angle B is between 55 and 65°, e.g. about 60°. FIG. 1b shows an enlarged part of FIG. 1a.

The inventors found that a particularly effective embodiment of the apparatus is that where the end of tip 7, i.e. the location where the filler wire exits the tip, lies between the substantially annular outlet opening of the process shielding gas 10 and the inlet 5. The tip 7 does not extend beyond the apparatus 1, so it does not penetrate the imaginary substantially annular plane formed by the outlet opening 10. The fact that the distance between the plane 10 and the inlet 5 is larger than the distance between the end of tip 7 and inlet 5 is clearly shown by the differing lengths of the two arrows L1, L2 in FIG. 1b.

EXAMPLES

Figure 2:
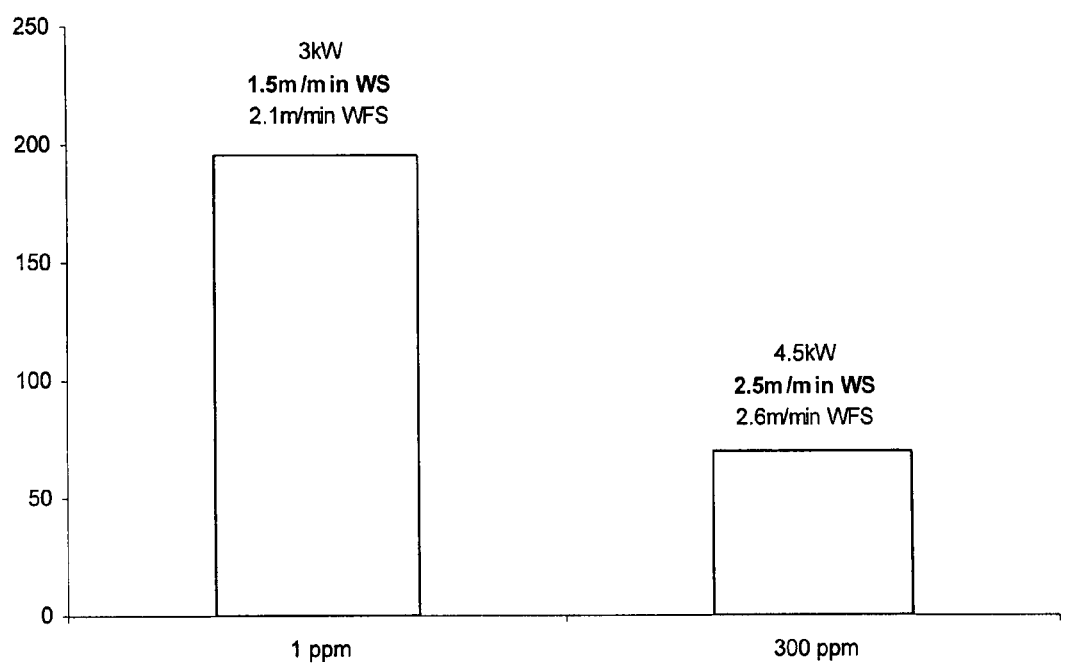
FIG. 2 shows data of a comparison of pore counts (Y-axis) between a process shielding gas containing 1 ppm moisture and 300 ppm moisture.

Welding experiments were performed on AA2024, AA7075 and AA5059-series alloy products all resulting in excellent weld properties and welding stability and consistency. FIG. 2 shows a comparison of pore counts (Y-axis) between a process shielding gas containing 1 ppm moisture and 300 ppm moisture. Welding conditions (laser power, welding speed (WS) and wire feed speed (WFS)) at high moisture contents were such that a higher pore count was expected in comparison to the 1 ppm case. However, due to the process according to the invention, the actual pore count was in fact much lower, demonstrating the versatility and robustness of the process.

It should be apparent that the present invention is not limited by the above-provided description, but rather is described by the claims appended hereto.

The invention claimed is:

1. A process for joining a first metal component to a second metal component at a joining region comprising the steps of:
projecting a laser beam onto one of the components for providing a melt pool on the joining region; wherein at least one member of the group consisting of the first component and the second component is made of a metal belonging to the group consisting of aluminum, aluminum alloy, aluminum or aluminum alloy substrate provided with a metallic coating system, aluminum or aluminum alloy provided with a cladding system;
providing a metal filler wire into the melt pool while substantially simultaneously providing a laminar flow of a substantially inert process shielding gas by means of a gas diffuser to the location of the melt pool, wherein the water content of the process shielding gas is at least 50 ppm;
directing the process shielding gas flow substantially coaxially around the filler wire; and
solidifying the melt pool thereby forming a joint at the joining region.

2. The process according to claim 1, wherein the laser beam moves substantially along the joining region to provide at least one member of the group consisting of a plurality of joints and a continuous joint along the joining region.

3. The process according to claim 1, wherein the angle between the laser beam and the coaxial gas flow is between 5 and 85°.

4. The process according to claim 1, wherein the angle between the laser beam and the coaxial gas flow is between 10 and 70°.

5. The process according to claim 1, wherein the angle between the laser beam and the coaxial gas flow is between 20 and 45°.

6. The process according to claim 1, wherein the water content of the process shielding gas is at least 100 ppm.

7. The process according to claim 1, wherein the water content of the process shielding gas is in the range of 50 to 500 ppm.

8. The process according to claim 1, wherein at least one of the first component and the second component is made of an AA2000 or AA7000 alloy.

9. The process according to claim 1, wherein the laser beam is provided as a single beam or as a double beam.

10. The process according to claim 1, wherein the first metal component is joined to the second metal component by brazing.

11. A process for joining a first metal component to a second metal component at a joining region comprising the steps of:
projecting a laser beam onto one of the components for providing a melt pool on the joining region; wherein the first and/or the second component is made of a metal belonging to the group consisting of aluminum, aluminum alloy, aluminum or aluminum alloy substrate provided with a metallic coating system, aluminum or aluminum alloy provided with a cladding system;
providing a metal filler wire into the melt pool while substantially simultaneously providing a laminar flow of a substantially inert process shielding gas to the location of the melt pool, wherein the water content of the process shielding gas is at least 50 ppm;
directing the process shielding gas flow substantially coaxially around the filler wire; and
solidifying the melt pool thereby forming a joint at the joining region.

12. The process according to claim 11, wherein the water content of the process shielding gas is at least 100 ppm.

13. The process according to claim 11, wherein the water content of the process shielding gas is in the range of 50 to 500 ppm.

* * * * *